United States Patent [19]

Knorre et al.

[11] 4,172,784

[45] Oct. 30, 1979

[54] PROCESS FOR THE SEPARATION OF CADMIUM (CD++)-IONS FROM SEWAGE, WASTE WATER AND AQUEOUS SOLUTIONS

[75] Inventors: Helmut Knorre, Seligenstadt; Gerhard Pohl, Hanau; Klaus Stützel, Bergen-Enkheim, all of Fed. Rep. of Germany

[73] Assignee: Deutsche Gold- und Silber-Scheideanstalt vormals Roessler, Frankfurt am Main, Fed. Rep. of Germany

[21] Appl. No.: 831,014

[22] Filed: Sep. 6, 1977

[30] Foreign Application Priority Data

Sep. 20, 1976 [DE] Fed. Rep. of Germany ....... 2642198

[51] Int. Cl.² .......................... C02B 1/20; C02C 5/04
[52] U.S. Cl. ........................................ 210/50; 210/52; 210/53; 210/54; 210/96.1; 423/101; 423/593
[58] Field of Search ............ 210/18, 28, 42 R, 50–54, 210/59, 63 R, 96 R; 423/101, 102, 593

[56] References Cited

U.S. PATENT DOCUMENTS

| 3,778,368 | 12/1973 | Nakamura et al. | 210/54 |
| 3,816,306 | 6/1974 | Roy | 210/50 |
| 3,931,007 | 1/1976 | Sugano et al. | 210/50 |

FOREIGN PATENT DOCUMENTS

| 2240549 | 3/1973 | Fed. Rep. of Germany . | |
| 50-85569 | 7/1975 | Japan | 210/63 R |
| 51-10176 | 1/1976 | Japan | 210/51 |

*Primary Examiner*—Charles N. Hart
*Assistant Examiner*—Peter A. Hruskoci
*Attorney, Agent, or Firm*—Beveridge, DeGrandi, Kline & Lunsford

[57] ABSTRACT

Cadmium ($Cd^{++}$) ions are separated from an effluent containing complexing agent such as nitrilotriacetic acid, ethylenediamine tetraacetic acid and/or diethylenetriamine pentaacetic acid, or their anionic salts by using an HS-containing triazine compound and $Fe^{+++}$ ions in a quantity at least equal to the amount of complexing agent.

5 Claims, No Drawings

PROCESS FOR THE SEPARATION OF CADMIUM (CD++)-IONS FROM SEWAGE, WASTE WATER AND AQUEOUS SOLUTIONS

The invention pertains to a process for the separation of cadmium (CD++)-ions from sewage, waste water and aqueous solutions which also contain nitrilotriacetic acid, ethylenediamine tetraacetic acid and/or diethylenetriamine pentaacetic acid, or their anionic salts. The process employs an HS-containing triazine compound of the formula

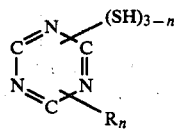

in which R is hydrogen, the same or different alkyl with 1 to 3 carbons, $-NR^1R^2$ or $-OR^3$;

$R^1$, $R^2$ and $R^3$ are hydrogen, the same or different alkyl with 1 to 6 carbons or phenyl;

n is a whole number from 0 to 2;

or of a water soluble salt of same compound as a precipitant.

From the German DS No. 2 240 549 it is known to precipitate $Cd^{++}$-ions from aqueous solutions by means of HS-containing triazine compounds of the above defined kind as a barely soluble precipitate. The precipitation of the $Cd^{++}$-ions will however succeed only, whenever the free metal ion concentration in the solution exceeds a certain minimum measure. Thus for example, it is not possible either, even with the use of a great excess of precipitant, to practicably completely precipitate $CD^{++}$-ions from an aqueous solution in which they are present as a nitrilotriacetate, ethylenediamine tetraacetate and/or diethylenetriamine pentaacetate complexes. On the basis of the high stability of the complexes, the free metal ion concentration in the solution is too low in this case for a precipitation to be effectuated. The process of the invention is characterized by accomplishing the precipitation of the $Cd^{++}$-ions in the presence of an at least equivalent quanity of $Fe^{+++}$-ions, related to the content of complexing agents in the solution, at a pH value between 4 and 10.

Surprisingly, the $Cd^{++}$-ions contained in the solution are essentially quantitatively precipitated as a barely soluble precipitate in the presence of the $Fe^{+++}$-ions even if concentrations of the $Cd^{++}$-ions is very low.

Particularly suitable precipitants for the process of the invention are the trismercaptotriazine of the formula

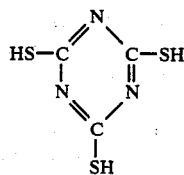

and its alkali metal salts.

In carrying out the present invention, the HS-containing triazine compounds or their water soluble salts are used in sufficient amount that at least one, preferably eight to twelve equivalents of mercapto or mercaptide groups are present per equivalent of $Cd^{++}$-ions.

Advantageously in the practice of the invention, the $Fe^{+++}$-ions are present in a molar excess, relative to the complexing agent in solution. Preferably, there should be a molar excess of 10 to 200%, especially 50 to 100% based on the amount of complexing agent in solution.

The required minimum concentration of $Fe^{+++}$-ions in the solution, and at the same time also the quantity of the HS-containing triazine compound or its water soluble salts, required for a substantially quantitative precipitation of the $Cd^{+++}$-ions may be found in a very simple manner by potentiometric means known in the art. For example, when using a pair of platinum/calomel electrodes, a discontinuous change of potential will occur whenever the added quantity of $Fe^{+++}$-ions is exactly equivalent of the amount of complexing agent present in the solution. The consumption of $Fe^{+++}$-ions, determined by this method, may serve as the stoichiometric measuring number of the amount of precipitant to be added subsequently. At the same time one must take into consideration that an excess of precipitant will promote the quantitative precipitation of the $Cd^{++}$-ions as an easily formed sediment which is a readily filterable precipitate.

The excess of HS-containing triazine compound or its water soluble salt is not harmful in the sewage or waste water since these compounds appear to have no toxic effect on plant and animal life. If desired or required, the $Fe^{+++}$-ion complex present in the filtrate may be oxidatively destroyed by using hydrogen peroxide, the oxidation agent most compatible with the environment, subsequent to the precipitation and separation of the $Cd^{++}$-ions. At the same time, the complexing agent is eliminated in its function and the $Fe^{+++}$-ions separate as barely soluble or substantially insoluble $Fe(OH)_3$. The iron hydroxide precipitate, after separation in a suitable acid, for example, in hydrochloric acid, may again be dissolved. Then, the required $Fe^{+++}$-salt solution will immediately be available again for recycle so that in the practice of the invention only the HS-containing triazine compound or its water-soluble salt and the hydrogen peroxide need be consumed.

The optimal operating range for the addition of the $Fe^{+++}$ salt solution lies at the pH values between 3 and about 4; for the precipitation of the $Cd^{++}$-ions at the pH values between about 4 and about 10 and for the precipitation of the $Fe(OHO)_3$ after the oxidation of the complexing agent with hydrogen peroxide, at a pH of 7 or more, preferably in the area of a pH of about 8. When treating very dilute $Cd^{++}$-complex solutions, it is desirable to assist the coagulation and sedimentation of the precipitate formed with the HS-containing triazine derivative or its water soluble salt, by the addition of a conventional flocculants according to the known methods.

It is particularly recommended to carry out the process of the invention in such a way that the sewage or effluent to be treated or the solution to be treated is initially adjusted to a pH of about 4. Then an $Fe^{+++}$ salt solution is introduced into the system in proper concentration while stirring at ambient temperature. The addition is carried out until the redox potential, measured with a submerged pair of platinum/calomel electrodes, changes suddenly; i.e. in a discontinuous manner. After determination of this point, at least a 10% excess of $Fe^{+++}$-ions, related to the theoretical consumption up to the end point so determined is added. Subsequently, a quantity of the precipitant is added. It is advantageous that the precipitating agent be in the form of a saturated solution of the sodium salt and that it be added in an amount at least equivalent to the consumption of $Fe^{+++}$-ions. Stirring is maintained during the addition and the mixture is adjusted with soda or caustic soda solution to a pH of about 5 to 7. It is then restirred for 15 minutes and finally the precipitate formed is separated by sedimentation and filtration.

Now the $Fe^{+++}$-ion complex in the filtrate may be decomposed with hydrogen peroxide. For this purpose the pH is effectively adjusted weakly alkaline and hydrogen peroxide, in the form of 30 to 50% by weight of aqueous solution is added while stirring until the $Fe^{+++}$-ions in the solution have separated quantitatively as a barely soluble $Fe(OH)_3$. The iron hydroxide deposit may then be filtered off and may again be converted with hydrochloric acid into the $Fe^{+++}$-salt solution. The latter is capable of use in the process as the source of the $Fe^{+++}$-ions. The filtrate of the iron hydroxide precipitation, is then passed into or discharged to the receiving body of water. Depending upon any existing regulations, the pH value of the effluent may be adjusted as desired.

The present invention will be explained in further detail as will be apparent from the following non-limiting examples.

EXAMPLE 1

400 ml. of a cadmium ethylenediamine tetraacetic acid (Cd-EDTA) solution were prepared by mixing of 200 ml. cadmium sulfate solution 1 4.564 g. of $CdSO_4$.8/3$H_2O$/l, 35.6 ml. of 0.1 M-EDTA solution (Titriplex III-Titrisol) and 164.4 8/3ml. $H_2O$. To this solution, an iron-III-chloride solution with 20 g. $Fe^{+++}$/l. was added continuously at ambient temperature while stirring. The course of the potential was measured with a pair of platinum/calomel electrodes which were submerged in the solution. After a consumption of 10 ml. of iron-III-chloride solution the course of the potential recorded with a potentiometer showed a turning point and thus indicated the end of the preliminary reaction. Starting from this point, another 20 ml. of iron-III-chloride 31 were used so that the total quantity added amounted to 30 ml. iron-III-chloride solution.

Then, 21 ml. of a solution of trismercapto triazine-trisodium salt (201 g. $TMTNa_3$/l) was added, was adjusted with 3 ml. HCl (1:1) to a pH of 5 and was then restirred for 15 minutes. After about 2 hours, the composition was filtered through a analytical filter and the residual content of cadmium in the filtrate was determined by means of atom absorption spectrometry (AAS). It amounted to 0.4 mg. Cd/l; i.e., the separation of the cadmium corresponded to applicable regulations governing effluent.

EXAMPLE 2

400 ml. of a cadmium diethylenetriamine pentaacetic acid (Cd-DTPA) solution were prepared by mixing 200 ml of cadmium sulfate solution (4.564 g. $CdSO_4$.8/3-$H_2O$/l) with 35.6 ml. 0.1 MDTPA penta-sodium salt solution and 164.4 ml. $H_2O$.

This solution was adjusted with 5.3 ml. of 1 N HCl to a pH of 4. Then an iron-III-chloride solution with 20 g. $Fe^{+++}$/l was added continuously at ambient temperature while stirring and the potential course was measured with a pair of platinum/calomel electrodes which were submerged in the solution. The potential curve recorded with a potentiometer showed a turning point at a consumption of 10 ml. of iron-III-chloride solution which indicated the end of the preliminary reaction. From this point, an additional 20 ml. of iron-III-chloride solution were added, so that the total added quantity amounted to 30 ml. iron-III-chloride solution.

Thereafter 21 ml. of a solution of trismercapto triazine-trisodium salt (201 g. $TMTNa_3$/l) were added and adjusted with 9.2 ml. of 10% HCl to a pH of 5. It was restirred for 15 minutes and after 2 hours it was filtered through a analytical filter. A residual content of less than 1 mg. Cd/l was found in the filtrate by means of AAS. The separation of the cadmium therefore met the requirements of regulations governing effluent discharge.

250 ml. of the yellow filtrate were then reacted within about 1 hour, while stirring at ambient temperature, with 15 ml. of 50% by weight $H_2O_2$. During this time the pH value was kept constant at about pH 7 by the addition of 4.2 ml. of 10% caustic soda solution. After about 20 hours, the iron quantitatively precipitated out of the solution as $Fe(OH)_3$ and was separated by filtration. Thus, the effluent solution was free of heavy metals and complexing agents.

EXAMPLE 3

200 ml. of a cadmium sulfate solution (4.564 g. $CdSO_4$. 8/3$H_2O$/l) were mixed with 35.6 ml. of 0.1 M-Nitriloriacetic acid (NTA)-trisodium salt solution and 164.4 ml. of water.

30 ml. of iron-III-chloride solution (20 g. $Fe^{+++}$/l) were added. Subsequently, 21 ml. of a solution of trismercapto triazine-trisodium salt (201 g. $TMTNa_3$/l) were added to the above solution at ambient temperature with stirring. The reaction mixture was adjusted to a pH of 7 with 1.4 ml. of 10% HCl, and was restirred for 15 minutes. After 2 hours it was filtered through a analytical filter.

In the filtrate a residual content of 0.33 mg. Cd/l was found by means of AAS. The separation of cadmium thus corresponded to the applicable regulations concerning effluent.

Although the foregoing examples show iron-III-chloride solutions, it is to be understood that any water soluble iron-III-salt may be used which will ionize to provide the necessary iron-III-ions for reaction. Likewise, although the invention is illustrated in terms of treating solutions, other liquids which are suspensions, sols, sludges, emulsions and the like may be treated in accordance with the invention.

Further modifications and variation of the invention will be apparent to those having skill in the art and are intended to form a part of this invention and encompassed by the following claims.

We claim:

1. A process for the separation of cadmium ($Cd^{++}$)-ions from aqueous liquids in which said cadmium ions are present as complexes of nitrilotriacetic acid, ethylenediamine tetraacetic acid and/or diethylenetriamino pentaacetic acid or their anionic salts, comprising contacting salt liquids with an HS-containing triazine compound of the general formula

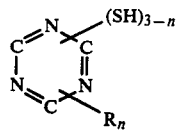

in which:
R is hydrogen, the same or different alkyl with 1 to 3 carbons, —NR$^1$R$^2$ or —OR$^3$;
R$^1$, R$^2$ and R$^3$ are hydrogen, the same or different alkyl with 1 to 6 carbons or phenyl;
n is a whole number from 0 to 2;
or a water-soluble salt thereof to precipitate said cadmium ions and wherein said compound is contacted in an amount such that at least one equivalent of mercapto or mercaptide groups is present per equivalent of cadmium ions the precipitation of the Cd$^{+++}$-ions takes place in the presence of an at least equivalent quantity of Fe$^{+++}$-ions, based on said complexing agent in said liquid, wherein said precipitation takes place at a pH value between 4 and 10, and separating the precipitate from the aqueous liquid.

2. The process of claim 1 wherein the precipitation of the Cd$^{++}$-ions takes place in the presence of a molar excess of Fe$^{+++}$-ions in the amount of 10 to 200%, based on the complexing agent in the liquid.

3. The process of claim 2 wherein said molar excess is in the amount of 50 to 100%.

4. The process of claim 1 wherein the required concentration of Fe$^{+++}$-ions in the liquid is determined by potentiometric means.

5. The process of claim 1 wherein filtration is used to separate the precipitate and subsequent to the precipitation and separation of the Cd$^{++}$-ions, a Fe$^{+++}$-ion complex formed in the filtrate is oxidized by addition of hydrogen peroxide at a pH above 7, and the Fe$^{+++}$-ions are then precipitated and separated as a barely soluble Fe(OH)$_3$.

* * * * *